United States Patent
Kawai et al.

(10) Patent No.: US 8,851,937 B2
(45) Date of Patent: Oct. 7, 2014

(54) CONNECTOR

(75) Inventors: Ryuji Kawai, Makinohara (JP); Hirotaka Fukushima, Makinohara (JP)

(73) Assignee: Yazaki Corporation, Tokyo (JP)

( * ) Notice: Subject to any disclaimer, the term of this patent is extended or adjusted under 35 U.S.C. 154(b) by 1 day.

(21) Appl. No.: 13/817,846

(22) PCT Filed: Feb. 28, 2012

(86) PCT No.: PCT/JP2012/054945
§ 371 (c)(1),
(2), (4) Date: Feb. 20, 2013

(87) PCT Pub. No.: WO2012/121061
PCT Pub. Date: Sep. 13, 2012

(65) Prior Publication Data
US 2013/0149918 A1    Jun. 13, 2013

(30) Foreign Application Priority Data
Mar. 4, 2011 (JP) .................................. 2011-048330

(51) Int. Cl.
*H01R 4/28* (2006.01)
*H01R 13/631* (2006.01)
*H01M 2/10* (2006.01)
*H01R 13/24* (2006.01)
*H01R 103/00* (2006.01)

(52) U.S. Cl.
CPC .......... *H01M 2/1083* (2013.01); *H01R 13/2421* (2013.01); *H01R 2103/00* (2013.01); *H01R 13/6315* (2013.01); *H01R 2201/26* (2013.01)
USPC ........................................................ 439/754

(58) Field of Classification Search
USPC ......... 439/638, 752–754, 274–275, 700, 218, 439/268–270, 886
See application file for complete search history.

(56) References Cited

U.S. PATENT DOCUMENTS 3,718,881 A * 2/1973 Szanny ....................... 338/22 R
4,186,561 A * 2/1980 Wishart ......................... 60/620

(Continued)

FOREIGN PATENT DOCUMENTS

DE 4229687 A1 3/1994
EP 1102360 A1 5/2001

(Continued)

OTHER PUBLICATIONS

International Search Report (PCT/ISA/210) dated Jun. 12, 2012, issued by the International Searching Authority in International Application No. PCT/JP2012/054945.

(Continued)

*Primary Examiner* — Jean F Duverne
(74) *Attorney, Agent, or Firm* — Sughrue Mion, PLLC

(57) ABSTRACT

A connector terminal includes a terminal connection portion, a wire connection portion, and a flange portion. The connector housing includes a wire connection portion accommodation portion that can accommodate the wire connection potion and a terminal connection portion accommodation portion that can accommodate the terminal connection portion. A rear holder covers an opening of the connector housing, and a part of the wire connection portion is penetratingly inserted into a through-hole of the rear holder to form an accommodation space in which a pipe-shaped spacer or a spring, into which the wire connection portion is penetratingly inserted, can be disposed.

1 Claim, 9 Drawing Sheets

(56) References Cited

U.S. PATENT DOCUMENTS

| | | |
|---|---|---|
| 5,906,520 A | 5/1999 | Frinker et al. |
| 6,086,432 A | 7/2000 | Frinker et al. |
| 6,431,912 B1 | 8/2002 | Mori |
| 7,070,458 B2 | 7/2006 | Axenbock et al. |
| 8,398,419 B2 * | 3/2013 | Coyle, Jr. ............... 439/275 |
| 8,545,276 B2 * | 10/2013 | Farahani ................ 439/700 |
| 2011/0059659 A1 | 3/2011 | Matsumoto et al. |
| 2013/0115821 A1 * | 5/2013 | Golko et al. ............ 439/638 |

FOREIGN PATENT DOCUMENTS

| | | |
|---|---|---|
| JP | 5-15073 A | 1/1993 |
| JP | 2010-267452 A | 11/2010 |
| WO | 2010024362 A1 | 3/2010 |

OTHER PUBLICATIONS

Written Opinion (PCT/ISA/237) dated Jun. 12, 2012, issued by the International Searching Authority, in International Application No. PCT/JP2012/054945.

European Search Report dated Jul. 2, 2014 issued by the European Patent Office counterpart European Patent Application No. 12754724.8.

* cited by examiner

CONNECTOR

TECHNICAL FIELD

The present invention relates to a connector which can be assembled to a vehicle and be connected to a battery for vehicle installation to supply electricity to an in-vehicle electrical device, and more particularly to a connector which enables a housing thereof to be used in common to a connector for charging.

BACKGROUND ART

Recently, as electrical components of a vehicle have been abruptly increased in kind and number, energy consumption of a battery for vehicle installation becomes growing, and thus charge to such a battery comes to be frequently carried out. There are a contact type and a plug type as a method for charging a battery for vehicle installation in the related art.
<Related Art 1: Contact Type in a Battery Mount State>

As a battery charging method in the related art in an electric vehicle (EV vehicle) such as a carrier that is used for the work in the yard, charging is performed by simply making front ends of a vehicle side terminal and a charger side terminal come into contact with each other (see Patent Document 1).

In this case, in order to secure connection reliability, one terminal pushes the other terminal by the repulsion of a spring to make the terminals come into certain contact with each other. According to this battery charging method 1 in the related art, the battery has already been installed in the vehicle, and thus it is not necessary to make the battery disengaged from an in-vehicle electric device side connector. Therefore, as advantages, terminals rarely rub each other, and thus the lifespan of the battery terminal is not shortened. By contrast, as problems, the electric vehicle is stopping during charging and thus is not usable.
<Related Art 2: Plug Type in a Battery Exchange Method>

In order to solve a problem called shortening of the charge time (=stoppage time), there is a battery exchange method to take out a battery which has been discharged from an undercarriage of a vehicle and to replace the discharged battery by a battery which has been charged.

FIGS. 9A and 9B are views explaining a battery exchange method in the related art. FIG. 9A is a conceptual view of the battery exchange method, and FIG. 9B is a cross-sectional view illustrating terminal shapes of connectors of respective devices. According to the battery exchange method as illustrated in FIG. 9A, when a battery B1 for vehicle installation that is installed in a vehicle A comes to have been discharged, the battery B1 for vehicle installation that has been discharged is taken out from the vehicle A, and another battery B2 for vehicle installation which has already been charged is loaded on the vehicle A. Accordingly, since the charge time can be reduced, the stoppage time is with time only for connector connection, and thus the stoppage time can be greatly reduced.

According to the work of the meantime, a battery side connector terminal 20T which is the male terminal of a connector 20 of the battery B1 that has been discharged is taken off from the female terminal 100T of a vehicle side connector 100 that feeds in-vehicle electric devices 50 that are various motors such as power windows in the vehicle through a wire (electric wire), and then is put into a hollow part 100V of the female terminal 100T of a charger side connector 100 (that is, a connector for feeding from a charger 60 which supplies DC current that is obtained by rectifying an AC power AC to the wire W) outside the vehicle. On the other hand, another battery B2 for vehicle installation that has been charged is carried to the inside of the vehicle, and the battery side connector terminal 20T of the connector 20 of the battery B2 for vehicle installation is put into the hollow part 100V of the female terminal 100T of the vehicle side connector 100 that feeds the in-vehicle electric devices 50.

In this case, a connector housing 10 and the female terminal 100T of the vehicle side connector 100 have the same shapes as a connector housing 10 and the female terminal 100T of the charger side connector 100, respectively, and the battery side connector terminal 20T of the battery B1 or B2 for vehicle installation is taken off from the hollow part 100V of the female terminal 100T of one side connector 100, and then is put into the hollow part 100V of the female terminal 100T of the other side connector 100.

In the case of adopting such a battery exchange method, since the vehicle side connector is affected by vibration and dust during traveling of the vehicle, contacts may come off or dust may get in the contact type connector, and thus satisfactory reliability may not be achieved. Therefore, plug-type connector is generally used to achieve the secure connection between the connector terminals.

CITATION LIST

Patent Document

[Patent Document 1] JP-A-H5-15073

SUMMARY OF INVENTION

Technical Problem

As described above, in the related art, it is necessary to make a connector in which in order to secure certain contact between contacts of a vehicle side connector, a plug-type terminal is locked in and fixed to the inside of a connector housing, and a locking structure with the terminal is provided in the connector housing.

Solution To Problem

In order to solve the above-described problems, according to the present invention, the following configuration may be provided.

(1) A connector including a connector housing and a connector terminal accommodated in the connector housing to be connected to a battery for vehicle installation,
wherein the connector terminal has one end at which a terminal connection portion, which is connected to a battery side connector terminal that is installed in the connector housing of the battery for vehicle installation, is installed, and the other end at which a wire connection portion, which is connected to a wire that is drawn from the rear side of the connector housing, is installed, wherein a flange portion that extends outwardly of the connector terminal is installed between the terminal connection portion and the wire connection portion,
wherein the connector housing includes a wire connection portion accommodation portion which is successively formed in an opening into which the connector terminal is inserted from the rear side, has a diameter that is substantially equal to a diameter of the flange portion, and is adapted to accommodate the wire connection portion, and a terminal connection portion accommodation potion which is installed forward than the wire connection portion accommodation portion, has a diameter that is smaller than a diameter of the wire connection portion, and is adapted to accommodate the terminal connection portion, and wherein a rear holder, in which a through-hole into which a part of the wire connection portion is adapted to be penetratingly inserted is formed, is installed to cover the opening of the connector housing, and the part of the wire connection portion is penetratingly inserted into the through-hole of the rear holder to form an accommodation space in which a pipe-shaped spacer or a spring, into which the wire connection portion is penetratingly inserted, is adapted to be disposed.

According to the connector having the above-described configuration, since the accommodation space that accommodates the spacer or the spring is provided between the flange and the rear holder, the connector terminal can be fixed to the inside of the connector housing by the spacer, and thus it is not necessary to lock and fix the connector terminal inside the connector housing. Further, since the combination of the connector terminal having the concave shape portion at the front end of the terminal connection portion and the spring can be applied to the charger side connector that forces the concave shape portion toward the battery for vehicle installation, and the combination of the connector terminal having the female terminal, into which the battery side connector terminal is inserted, at the front end of the terminal connection portion and the spacer can be applied to the vehicle side connector that is fitted with the battery for vehicle installation, the connectors can be commonized.

BRIEF DESCRIPTION OF DRAWINGS

FIGS. 1A and 1B are views explaining a connector according to a related technique in a battery exchange method, in which FIG. 1A is a conceptual view of a battery exchange method, and FIG. 1B is a cross-sectional view explaining the terminal shape of the connector according to the related technique.

FIGS. 4A to 4C are views illustrating the state of both connectors before an in-vehicle electric device side connector according to the present invention is inserted into a battery side connector, in which FIG. 4A is a perspective view of both connectors, FIG. 4B is a plan view thereof, and FIG. 4C is an A-A arrow view of FIG. 4B.

FIGS. 5A to 5C are views illustrating the state of both connectors after an in-vehicle electric device side connector according to the present invention is inserted into a battery side connector, in which FIG. 5A is a perspective view of both connectors, FIG. 5B is a plan view thereof, and FIG. 5C is an A-A arrow view of FIG. 5B.

FIGS. 6A to 6C are views illustrating the state of both connectors before a charger side connector according to the present invention is inserted into a battery side connector, in which FIG. 6A is a perspective view of both connectors, FIG. 6B is a plan view thereof, and FIG. 6C is a B-B arrow view of FIG. 6B.

FIGS. 7A to 7C are views illustrating the state of both connectors which are in the middle of inserting a charger side connector according to the present invention into a battery side connector, in which FIG. 7A is a perspective view of both connectors, FIG. 7B is a plan view thereof, and FIG. 7C is a B-B arrow view of FIG. 7B.

FIGS. 8A to 8C are views illustrating the state of both connectors after a charger side connector according to the present invention is inserted into a battery side connector, in which FIG. 8A is a perspective view of both connectors, FIG. 8B is a plan view thereof, and FIG. 8C is a B-B arrow view of FIG. 8B.

FIGS. 9A and 9B are views explaining a battery exchange method in the related art, in which FIG. 9A is a conceptual view of the battery exchange method, and FIG. 9B is a cross-sectional view illustrating terminal shapes of connectors of respective devices.

DESCRIPTION OF EMBODIMENTS

Hereinafter, a vehicle side connector that is convertible into a charger side connector according to an embodiment of the present invention will be described on the basis of the drawings.

This Embodiment

Vehicle Side Connector that is Convertible onto Charger Side Connector

FIGS. 2A to 8C are views explaining this embodiment, in which FIGS. 2A to 3B are conceptual views of the whole configuration of the present invention, FIGS. 4A to 5C are views explaining a vehicle side connector according to this embodiment, and FIGS. 6A to 8C are views explaining a charger side connector.
<Whole Configuration According to this Embodiment>

In FIGS. 2A to 3B, 11 denotes a vehicle side connector, 13 denotes a charger side connector, and 20 denotes a battery side connector. Hereinafter, explanation will be made in the order of the vehicle side connector 11, the charger side connector 13, and the battery side connector 20.
<Vehicle Side Connector 11>

Figure 2A:
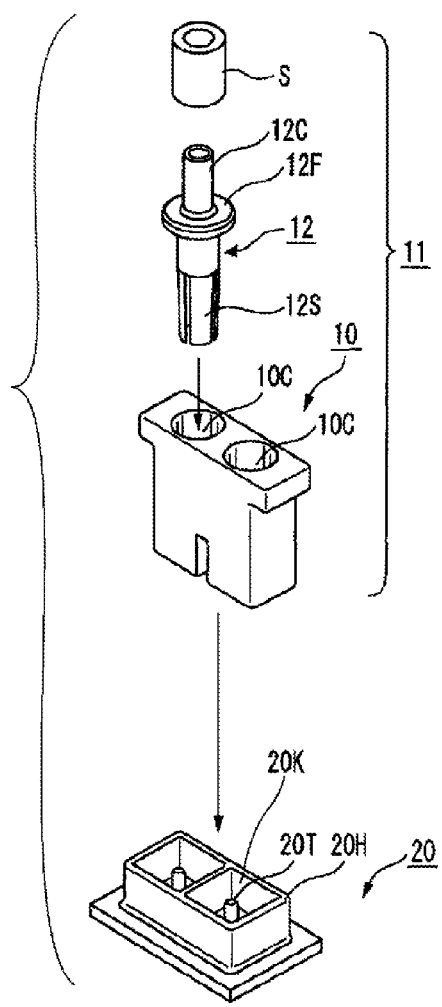
FIG. 2A is an exploded perspective view of a vehicle side connector 11 according to an embodiment of the present invention.
Figure 2B:
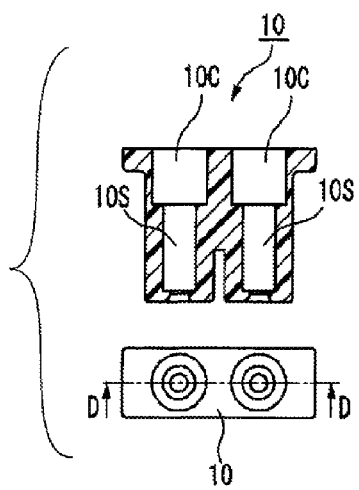
FIG. 2B illustrates a plan view of a connector housing 10 illustrated in FIG. 2A and a D-D cross-sectional view thereof.

In FIGS. 2A and 2B, the vehicle side connector 11 includes a connector housing 10 having two insertion holes, a vehicle side connector terminal 12 inserted into the two insertion holes of the connector housing 10, and a spacer S inserted into a wire connection portion 12C, which has a cylindrical part on which a head part of the vehicle side connector terminal 12 is formed, to be in contact with a flange portion 12F. The vehicle side connector 11 is covered by a rear holder H (see FIG. 4C) and is fastened by a screw N (see FIG. 4C).

The vehicle side connector terminal 12 is in the form of a lengthwise metal cylinder as a whole, and the flange portion 12F is formed on a slightly upper portion of the center thereof. The wire connection portion 12C above the flange portion 12F is used as a wire crimping portion. The terminal connection portion 12S, which has a cylindrical part that is a hollow portion 12V formed below the flange portion 12F, has a slit formed from the lower front end to the middle of the terminal connection portion 12S to form an elastic portion, and thus a battery side terminal 20T of the battery side connector 20 can be easily inserted into the insertion hole.

In the connector housing 10, a wire connection portion accommodation portion 10C, which is formed in a cylindrical space that extends from the flange portion 12F to the outside with a diameter width of the flange portion 12F, and a terminal connection portion accommodation portion 10S, which is formed in a cylindrical space that extends from the wire connection portion accommodation portion 10C to a counterpart terminal insertion hole with a diameter that is smaller than the diameter width of the wire connection portion accommodation portion 10C, are provided.

The rear holder H blocks the wire connection portion accommodation portion 10C of the connector housing 10. On the rear holder H, a through-hole H1, into which the wire connection portion 12C of the vehicle side connector terminal 12 is penetratingly inserted, is formed, and by penetratingly inserting the connection portion 12C of the vehicle side connector terminal 12 into the through-hole H1, the leaning of the vehicle side connector terminal 12 is suppressed.

In the case of using a commonly used connector housing (hereinafter referred to as a "common housing") on the vehicle side, the vehicle side connector 11 is incorporated in a cylindrical space (accommodation space) that extends from the flange portion 12F in which the wire crimping portion of the terminal is accommodated to the rear holder H in a state where the spacer S is assembled on the vehicle side connector terminal 12. Through this, the vehicle side connector terminal 12 is fixed by the spacer S, and thus the vehicle side connector terminal 12 can be fitted onto the battery side connector terminal 20T when it is inserted into the connector.

<Charger Side Connector 13>

Figure 3A:
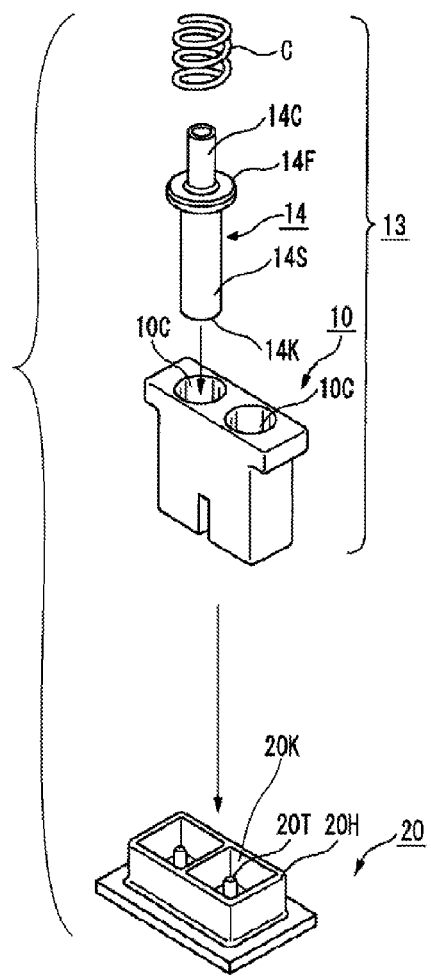
FIG. 3A is an exploded perspective view of a charger side connector 13 according to an embodiment of the present invention.
Figure 3B:
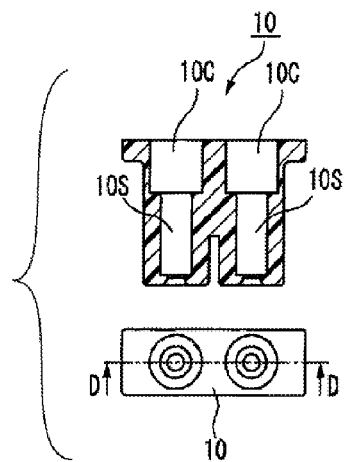
FIG. 3B illustrates a plan view of a connector housing 10 illustrated in FIG. 3A and a D-D cross-sectional view thereof.
Figure 4A:
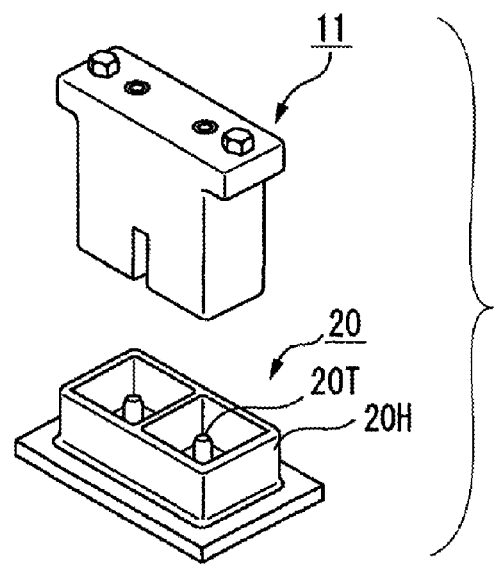
Figure 4B:
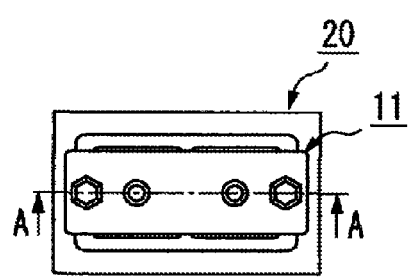
Figure 4C:
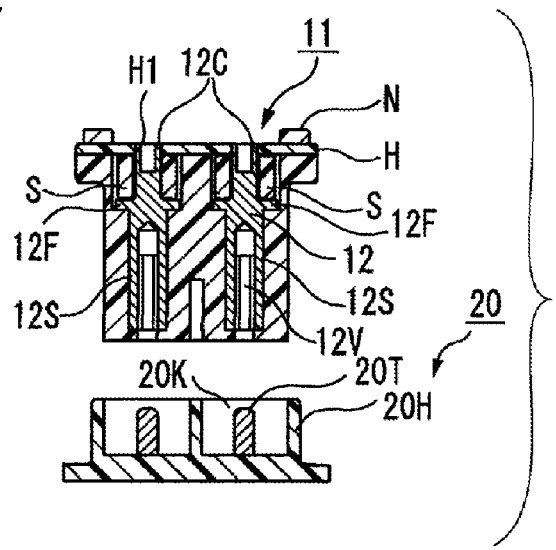
Figure 5A:
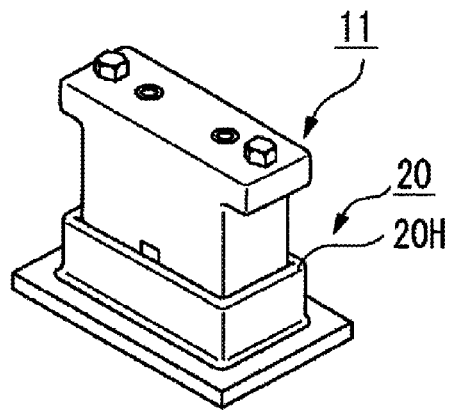
Figure 5B:
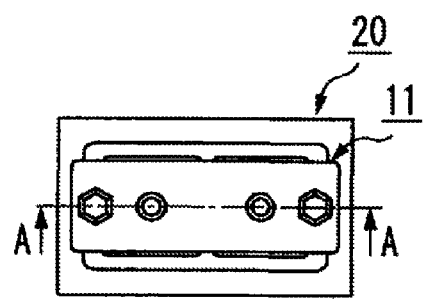
Figure 5C:
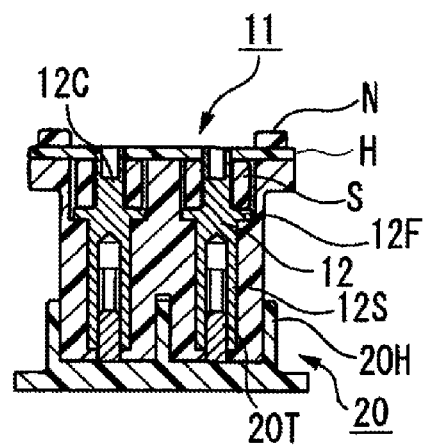
Figure 6A:
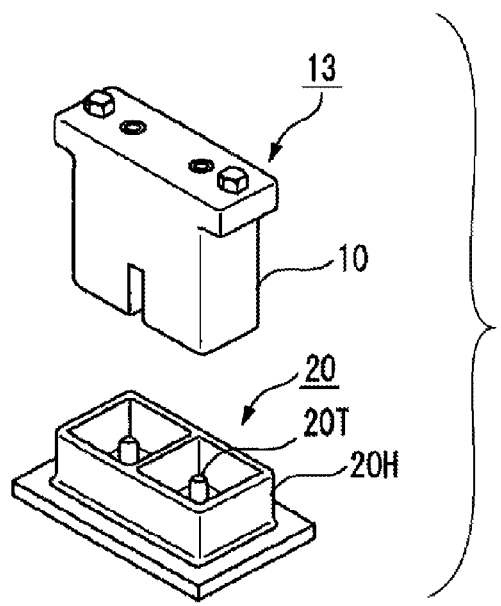
Figure 6B:
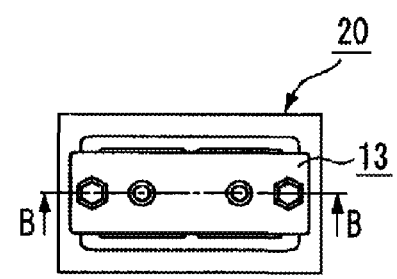
Figure 6C:
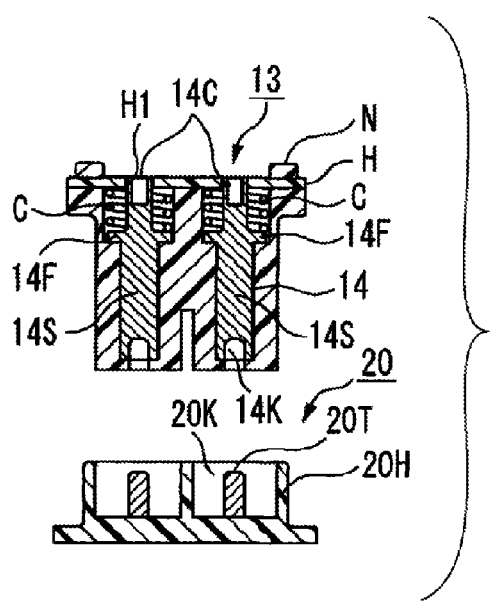
Figure 7A:
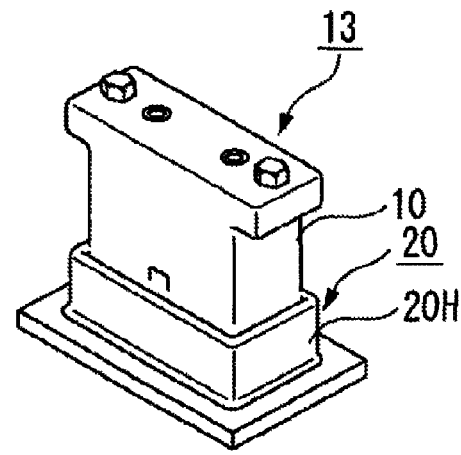
Figure 7B:
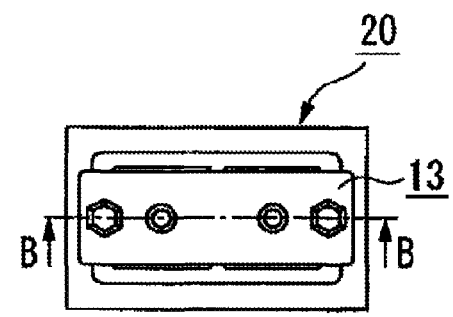
Figure 7C:
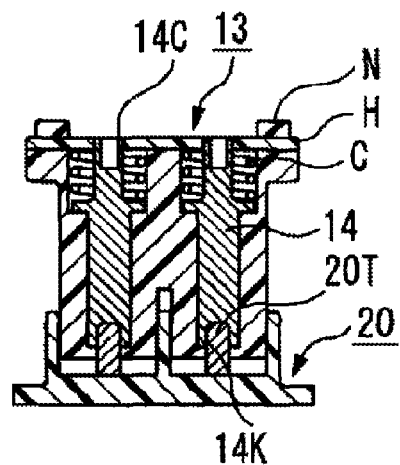
Figure 8A:
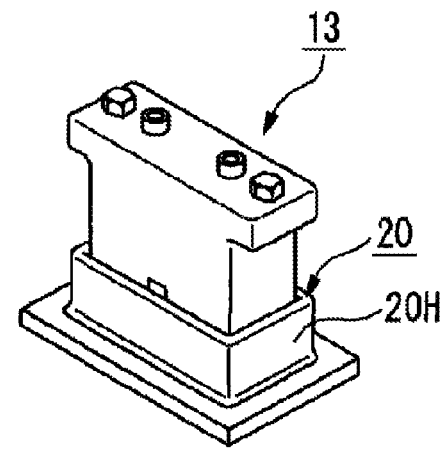
Figure 8B:
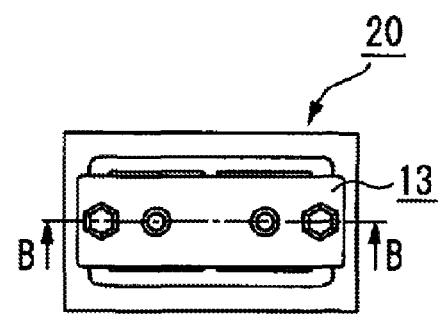
Figure 8C:
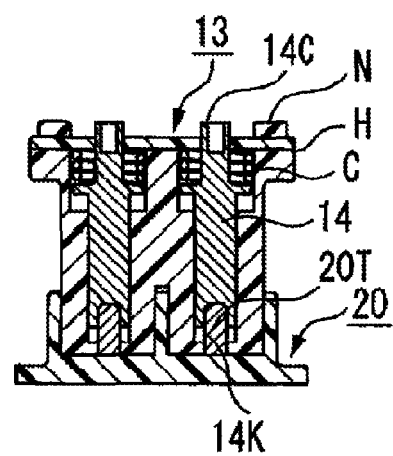

In FIGS. 3A and 3B, the charger side connector 13 includes a connector housing 10 having two insertion holes, a charger side connector terminal 14 inserted into the two insertion holes of the connector housing 10, and a spring C inserted into a wire connection portion 14C of the charger side connector terminal 14 to be in contact with a flange portion 14F. The charger side connector 14 is covered by a rear holder H (see FIG. 5C) and is fastened by a screw N (see FIG. 5C).

The charger side connector terminal 14 is in the form of a lengthwise metal cylinder as a whole, and the flange portion 14F is formed on a slightly upper portion of the center thereof. The wire connection portion 14C above the flange portion F is used as a wire crimping portion. The terminal connection portion 14S below the flange portion 14F has a slightly large diameter, and is solid. A concave portion 14K (see FIG. 6C) is formed at the lower front end, and the front end of the battery side connector terminal 20T of the battery side connector 20 becomes in contact with the concave portion 14K.

In the connector housing 10, a wire connection portion accommodation portion 10C, which is formed in a cylindrical space that extends from the flange portion F to the outside with a diameter width of the flange portion 14F, and a terminal connection portion accommodation portion 10S, which is formed in a cylindrical space that extends from the wire connection portion accommodation portion 10C to a counterpart terminal insertion hole with a diameter that is smaller than the diameter width of the wire connection portion accommodation portion 10C, are provided.

On the rear holder H, a through-hole H1, into which the wire connection portion 14C of the charger side connector terminal 14 is penetratingly inserted, is formed, and by penetratingly inserting the connection portion 14C of the charger side connector terminal 14 into the through-hole H1, the leaning of the charger side connector terminal 14 is suppressed.

In the case of using a common housing on the charger side, the common housing is incorporated in the charger side connector 13, in a state that the spring C is assembled on the charger side connector terminal 14 in a cylindrical space (accommodation space) of the housing where the wire connection portion 14C of the terminal is accommodated. Through this, the charger side connector terminal 14 is pressed in the direction of the battery side connector terminal 20T by the spring C, and thus the charger side connector terminal 14 can be fitted onto the battery side connector terminal 20T when it is inserted into the connector.

As described, according to this embodiment, the connector housing 10 of the charger side connector 13 has the same shape/dimensions/materials as the connector housing 10 of the vehicle side connector 11, and thus the communization of the components can be sought.

<Battery Side Connector 20>

Figure 9A:
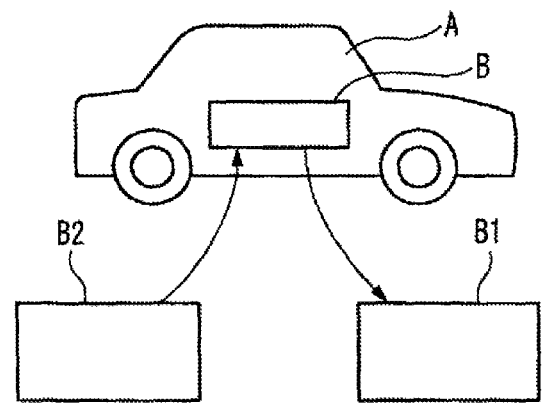
Figure 9B:
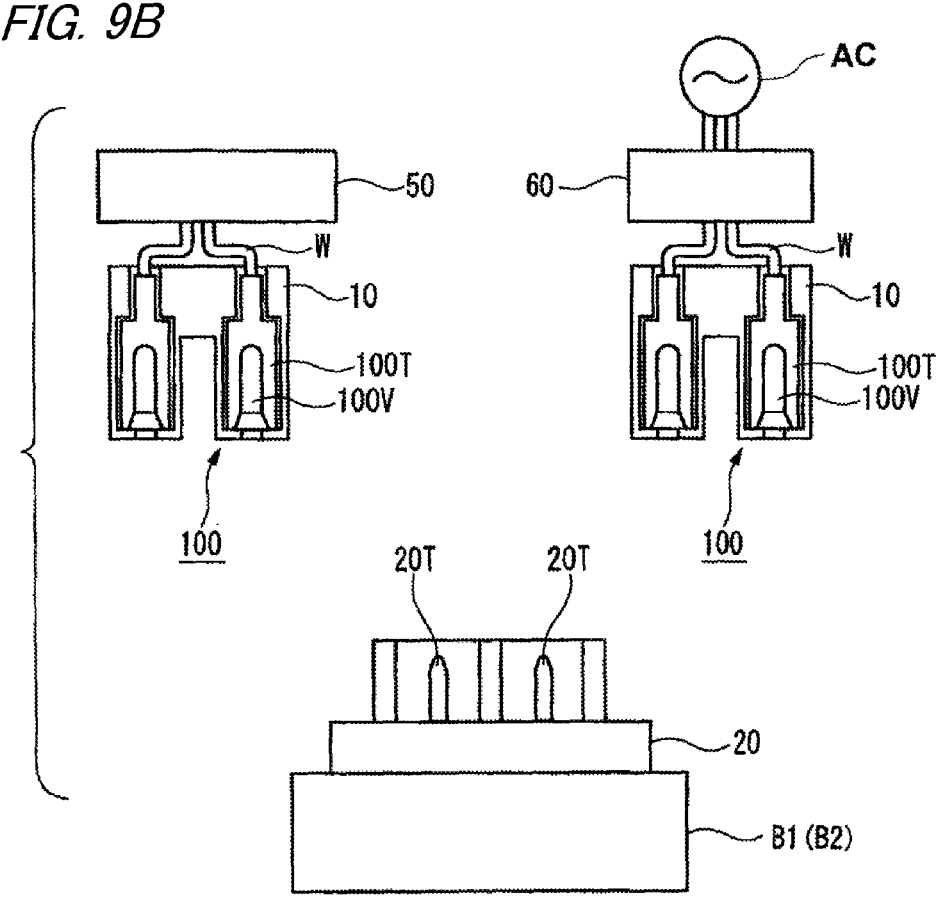

The battery side connector 20 is the same as that in the related art as illustrated in FIGS. 9A and 9B. An opening 20K, into which the front end of the connector housing 10 of the counterpart connector is inserted, is formed at two places of the connector housing 20H, and the battery side connector terminal 20T is provided in the center of the openings 20K.

<Insertion of Vehicle Side Connector 11>

In FIGS. 4A to 5C, in the case of inserting the battery side connector 20 into the vehicle side connector 11, the vehicle side connector 11 is brought down from right above the battery side connector 20 toward the battery side connector 20, and the battery side connector terminal 20T of the battery side connector 20 is inserted while rubbing the terminal connection portion 12S (see FIG. 2A) that is the elastic part of the vehicle side connector terminal 12 of the vehicle side connector 11. At this time, although the vehicle side connector terminal 12 of the vehicle side connector 11 is pushed upward, the flange portion 12F (see FIG. 2A) becomes in contact with the rear holder H through the spacer S, and thus the vehicle side connector terminal 12 does not move upward. Accordingly, the battery side connector terminal 20T of the battery side connector 20 is inserted and fitted into the vehicle side connector terminal 12 to complete the insertion.

<Insertion of Charger Side Connector 13>

In FIGS. 6A to 8C, in the case of inserting the battery side connector 20 into the charger side connector 13, the charger side connector 13 is brought down from right above the battery side connector 20 toward the battery side connector 20, and the front end of the battery side connector terminal 20T of the battery side connector 20 becomes in contact with and is inserted into the concave portion 14K formed at the front end of the terminal connection portion 14S (see FIG. 3A) of the charger side connector terminal 14 of the charger side connector 13 while pressing the concave portion 14K. At this time, although the charger side connector terminal 14 of the charger side connector 13 is pushed upward, the flange portion 14F is pushed toward the battery side connector terminal 20T by the spring C, and the front end of the battery side connector terminal 20T of the battery side connector 20 is inserted into and becomes in contact with the concave portion 14K of the charger side connector terminal 14 of the charger side connector 13 to complete the insertion. Since the charger side is not affected by vibration and dust during traveling of the vehicle, it is not necessary to make the terminal a plug type, and it is sufficient if the front end of the battery side connector terminal 20T is inserted into and becomes in contact with the concave portion 14K of the charger side connector terminal 14. Accordingly, since the opportunity when the terminals rub when the battery is installed in the vehicle or when the battery is removed from the vehicle is reduced to half, the state of the terminal surface is kept well for a long time that is double the time in the related art, and thus contacts may come off or dust may get in the contact type connector, and thus poor contact is hard to happen.

<Related Technique: Combination of Plug Type Connector and Contact Type Connector in the Battery Exchange Method>

Here, as the related technique, it has been considered that the vehicle side connector being carried adopts the plug type to secure the certain contact between the terminals, and the charger side connector that is put outside the vehicle adopts the contact type connector with a little rubbing.

Figure 1A:
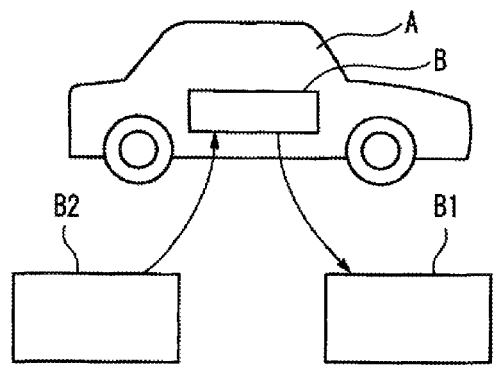

According to the battery exchange method of the related technique, as illustrated in FIG. 1A, when a battery B1 for vehicle installation that is installed in a vehicle A comes to have been discharged, the battery B1 for vehicle installation that has been discharged is taken out from the vehicle A, and another battery B2 for vehicle installation which has already been charged is loaded on the vehicle A. Accordingly, the charge time can be reduced, and thus the stoppage time can be greatly reduced. According to the work of the meantime, the battery side connector terminal 20T of the connector 20 of the battery B1 for vehicle installation that has been discharged is taken off from the hollow part 12V of the vehicle side connector terminal 12 that is the female terminal of the vehicle side connector 11, and then is put "in contact with" the concave portion 14K of the charger side connector terminal 14 of the charger type connector 13 outside the vehicle.

Figure 1B:
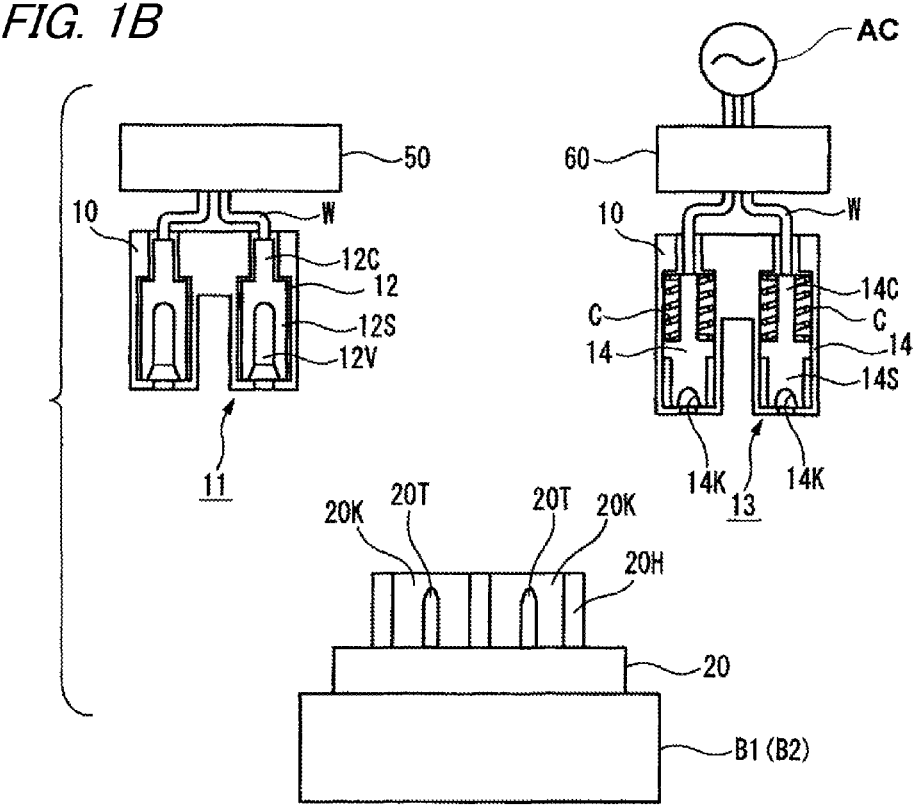

According to this related technique, unlike the related art of FIGS. 9A and 9B, it is assumed that the vehicle side connector terminal 12 of the vehicle side connector 11 and the charger side connector terminal 14 of the charger side connector 13 are separated from each other. That is, the vehicle side connector terminal 12 of the vehicle side connector 11 is of a plug type same as the female terminal 100T of the connector 100 (see FIG. 9B) in the related art, and has a terminal lock structure such as a typical lock structure so that the female terminal 100T does not retreat during the insertion operation thereof. In FIG. 1B, a stepped portion is provided on the boundary between the wire connection portion 12C of the vehicle side connector terminal 12 and the terminal connection portion 12S, and this stepped portion is locked with a stepped portion formed on the inner wall of the connector housing 10 to make the retreatment thereof impossible. Through this, the charger side connector terminal 14 of the charger side connector 13 applies a regular force to the counterpart terminal side since the spring C is inserted into the circumference of the wire connection portion 14C to be accommodated in the housing 10, and one end of the spring C becomes in contact with the inner wall of the housing. Further, the lower part of the charger side connector terminal 14 forms the concave portion 14K at the front end of the terminal connection portion 14S formed on the cylindrical portion, and the concave portion 14K is shaped as if the front end portion of the battery side connector terminal 20T of the battery side connector 20 becomes in contact with the concave portion 14K. Further, if the concave portion 14K of the terminal connection portion 14S is pressed by the front portion of the battery side connector terminal 20T of the battery side connector 20 during the insertion operation thereof, the charger side connector terminal 14 comes to retreat.

<Advantages of the Related Technique>

In FIG. 1B, if the battery side connector terminal 20T of the battery B1 for vehicle installation that has been discharged is taken off from the hollow part 12V of the vehicle side connector terminal 12 of the vehicle side connector 11 on the side of the in-vehicle electric devices 50 and then is pushed toward the concave portion 14K of the charger side connector terminal 14 of the charger side connector 13 outside the vehicle, the charge side connector terminal 14 is pushed by the battery side connector terminal 20T into the inside of the charger side connector 13 to be urged by the spring C, the battery side connector terminal 20T of the battery side connector 20 becomes in contact with the concave portion 14K of the charger side connector terminal 14 of the charger side connector 13 in a state where the both housings are completely fitted into each other to start the charging.

As described above, since the front end of the battery side connector terminal 20T of the battery side connector 20 is in a simple contact state with the concave portion 14K of the charger side connector terminal 14 through pressing thereof, but is not of the plug type in the related art that the terminals strongly rub each other, promotion of abrasion of the connector terminal and abrasion of the terminal surface treatment can be avoided, and the lifespan of the terminal is prolonged for double soon in comparison to that in the related art.

Further, since the battery is outside of the vehicle during charging by this contact type, no vibration occurs, and there is not the fear that dust invades the contact portion since the charge environment is regulated well.

<Problems of Related Technique>

In the related technique as described above, the plug connector is used as the vehicle side connector in order to secure certain contact between the terminals, and the contact type connector with a little rubbing is used as the charger side connector. Here, according to the vehicle side connector that is the plug type connector, there is the need that the plug type terminal is locked in and fixed to the inside of the connector housing, and thus the vehicle side connector that is completed by locking and fixing the terminal is unable to be converted into the charger side connector in which the spring is provided to move the terminal. Accordingly, it is necessary to separately make a connector with a terminal locking structure.

CONCLUSION

As described above, according to an embodiment of the present invention, by diverting the technique in the related art and securing reliability and by changing the combination to match the use terms, the use terms of the battery can be extended. Specifically, by dividedly using the charger side and vehicle side terminal shapes based on the user terms, the abrasion of the battery side terminal is suppressed, and the battery can be used for a long term to reduce the cost to hang to the battery.

Priority is claimed on Japanese Patent Application No. 2011-048330 filed in the Japan Patent Office on Mar. 4, 2011, the contents of which are incorporated herein by reference.

INDUSTRIAL APPLICABILITY

According to the connector of the present invention, which can be assembled in the vehicle and be connected to the battery for vehicle installation, the connector housing in the connector that feeds the in-vehicle electric devices can be commonized through only the change of the inside design thereof, resulting in saving the cost.

REFERENCE NUMERALS LIST

10: connector housing (common)
10C: wire connection portion accommodation portion
10S: terminal connection portion accommodation portion
11: vehicle side connector (connector)
12: vehicle side connector terminal (connector terminal)
12C: wire connection portion
12F: flange portion
12S: terminal connection portion 12V: hollow portion
13: charger side connector (connector)
14: charger side connector terminal (connector terminal)
14C: wire connection portion
14F: flange portion
14K: concave portion
14S: terminal connection portion
20: battery side connector
20K: opening
20T: battery side connector terminal (male)
AC: alternate current power supply
50: in-vehicle electric device
B1: completely discharged battery for vehicle installation
B2: fully charged battery for vehicle installation
C: spring
H: rear holder
H1: through-hole
N: screw
S: spacer

The invention claimed is:

1. A connector including a connector housing and a connector terminal accommodated in the connector housing to be connected to a battery for vehicle installation,
wherein the connector terminal has one end at which a terminal connection portion, which is connected to a battery side connector terminal that is installed in the connector housing of the battery for vehicle installation, is installed, and the other end at which a wire connection portion, which is connected to a wire that is drawn from the rear side of the connector housing, is installed, wherein a flange portion that extends outwardly of the connector terminal is installed between the terminal connection portion and the wire connection portion,
wherein the connector housing includes a wire connection portion accommodation portion which is successively formed in an opening into which the connector terminal is inserted from the rear side, has a diameter that is substantially equal to a diameter of the flange portion, and is adapted to accommodate the wire connection portion, and a terminal connection portion accommodation potion which is installed forward than the wire connection portion accommodation portion, has a diameter that is smaller than a diameter of the wire connection portion, and is adapted to accommodate the terminal connection portion, and
wherein a rear holder, in which a through-hole into which a part of the wire connection portion is adapted to be penetratingly inserted is formed, is installed to cover the opening of the connector housing, and the part of the wire connection portion is penetratingly inserted into the through-hole of the rear holder to form an accommodation space in which a pipe-shaped spacer or a spring, into which the wire connection portion is penetratingly inserted, is adapted to be disposed.

* * * * *